Patented Aug. 30, 1938

2,128,534

UNITED STATES PATENT OFFICE 2,128,534

PROCESS FOR PRESSURE MOLDING

Arthur M. Howald, Toledo, Ohio, assignor, by mesne assignments, to Plaskon Company, Incorporated, a corporation of Delaware No Drawing. Application March 20, 1935, Serial No. 12,015

5 Claims. (Cl. 18—55)

This invention relates to processes for pressure molding and will be described as applied to pressure molding of heat-hardened compounds such as formaldehyde urea condensation products and formaldehyde condensation products, but it is also applicable to molding of permanently thermoplastic materials and to molding of materials which are shaped by cold pressing.

In order to facilitate removal of molded articles from their molds it is customary to employ lubricants, such lubricants being materials of greasy consistency which do not decompose at molding temperatures. Metallic stearate, especially zinc stearate, is extensively used, for the reason that it is solid at ordinary temperatures and can be ground and mixed as a powder into the powdered molding material. The lubricant, to be effective, should be sufficiently insoluble in the material to be molded that when the material is subjected to heat and pressure in the mold, some of the lubricant will bleed out of the material to the mold surface. Since the lubricant is mixed throughout the material, much of it remains the molded object as mechanically-held particles, which in some cases have a deleterious effect; for example, in some molded articles translucency is desirable and the desired translucency is decreased by the presence throughout the object of mechanically-held particles of lubricant.

For the purpose of reducing the bulk of charges of molding compounds so that they will not overflow their molds and for the purpose of facilitating rapid charging of multiple cavity molds with accurately measured quantities of material, as well as for the purpose of reducing the flow necessary for the material to conform to the shape of the mold, the charges are usually preformed into compressed blanks which more or less resemble the shape of the molded article. I have found that by lightly spraying such preforms with a lubricant in solution, the presence of the lubricant in the molded object can be confined nearly to the surface and the amount of lubricant in the molded object reduced to a small fraction of the amount present in similar objects made of material with lubricant mixed throughout. The lubricant to be sprayed upon the preform, in accordance with my invention, should be dissolved in a volatile solvent which quickly evaporates. In the preform, the granules of powder, though tightly pressed together, have not coalesced and when the surface is lightly sprayed with the solution of lubricant and solvent, the solution permeates into the minute interstices among the surface granules, where the lubricant is left after evaporation of the solvent. When the preform is placed in the mold and the material softens and flows under heat and pressure, the lubricant, being insoluble in the softened material, is forced out to the mold surface.

In carrying out my invention, molding compound is prepared in any preferred way and pressed into preforms. The preforms are then sprayed lightly with a solution of zinc stearate dissolved in methanol. The depth to which the solution permeates the preforms will depend upon the amount of solution applied to them. Where the preform resembles the shape of the molded article quite closely, as a button preform resembles in shape a molded button, the preform need be only lightly sprayed, but where the preform resembles the molded object less closely in shape, as for example when a bowl is molded from a disk-shaped preform, the solution of lubricant and solvent should be applied more heavily so that the blank may be permeated to a greater depth and the lubricant thus distributed through the parts of the material which flow to the surface during the molding operation.

The embodiment of my invention herein shown and described is to be regarded as illustrative only, and it is to be understood that the invention is susceptible to variation, modification and change within the spirit and scope of the subjoined claims.

Having described my invention, I claim:—

1. In a process for preparing plastic materials to be molded under heat and pressure, the steps of pressing the material in granular condition into a preform of granular structure, applying to the surface of the preform a solution containing a mold lubricant which is insoluble in the molding material, said solution being supplied in quantity sufficient only to permeate among the granules adjacent the surface of the preform, and evaporating the solvent.

2. In a process for preparing plastic materials to be molded, the steps of pressing the plastic material in granular condition into a preform of granular structure and lightly spraying the surface of the preform with sufficient of a solution in which the material of the preform is insoluble to permeate among the granules adjacent the surface of the preform, the said solution containing a mold lubricant which is insoluble in the material of the preform.

3. In a process for preparing plastic materials to be molded under heat and pressure, the steps of pressing the material in granular condition into a preform, lightly spraying the preform with sufficient of a solution containing metallic stearate to permeate among the granules in the portion of material which flows to adjacent the mold surface during the molding operation, and removing the solvent.

4. In a process for preparing urea-formaldehyde plastic material to be molded under heat and pressure, the steps of pressing the urea-formaldehyde material in granular condition into a preform of granular structure and spraying the surface of the preform with a solution consisting of a volatile solvent and a lubricant which is insoluble in the urea-formaldehyde material, the quantity of solution sprayed upon the surface of the preform being sufficient only to permeate among the granules of the material which will flow to adjacent the mold surface during the molding operation.

5. The method of preparing urea-formaldehyde plastic material to be molded under heat and pressure which includes the steps of pressing the urea-formaldehyde material in granular condition into a preform having granular structure, lightly spraying the surface of the preform with a solution of zinc stearate dissolved in methanol, and removing the methanol.

ARTHUR M. HOWALD.